United States Patent [19]
Howeth et al.

[11] 3,884,071
[45] May 20, 1975

[54] ELECTRONIC TON-MILE INDICATOR

[75] Inventors: Calvin Richard Howeth, Cleveland; Frank Angelo Dickey, Oklahoma City, both of Okla.

[73] Assignee: Calvin Richard Howeth, Moore, Okla.

[22] Filed: Dec. 11, 1973

[21] Appl. No.: 423,703

[52] U.S. Cl. ................................................. 73/151
[51] Int. Cl. ............................................. E21b 47/00
[58] Field of Search .......... 73/151, 133, 151.5, 152; 200/61.17

[56] References Cited
UNITED STATES PATENTS

| | | | |
|---|---|---|---|
| 3,298,226 | 1/1967 | Hildebrandt | 73/151 |
| 3,309,508 | 3/1967 | Witt | 235/150.52 |
| 3,382,713 | 5/1968 | Chutter | 73/151 |

*Primary Examiner*—Jerry W. Myracle
*Attorney, Agent, or Firm*—Strauch, Nolan, Neale, Nies & Kurz

[57] ABSTRACT

A highly reliable, extremely accurate ton-mile indicator utilizing electronic components employing rotating magnet-magnetic reed switch pulse generation for distance measurement, resistance strain gauge and bridge circuit means or piezoelectric crystal means for weight output signal generation, and a multiplier circuit integrator for ton-mile register means.

21 Claims, 11 Drawing Figures

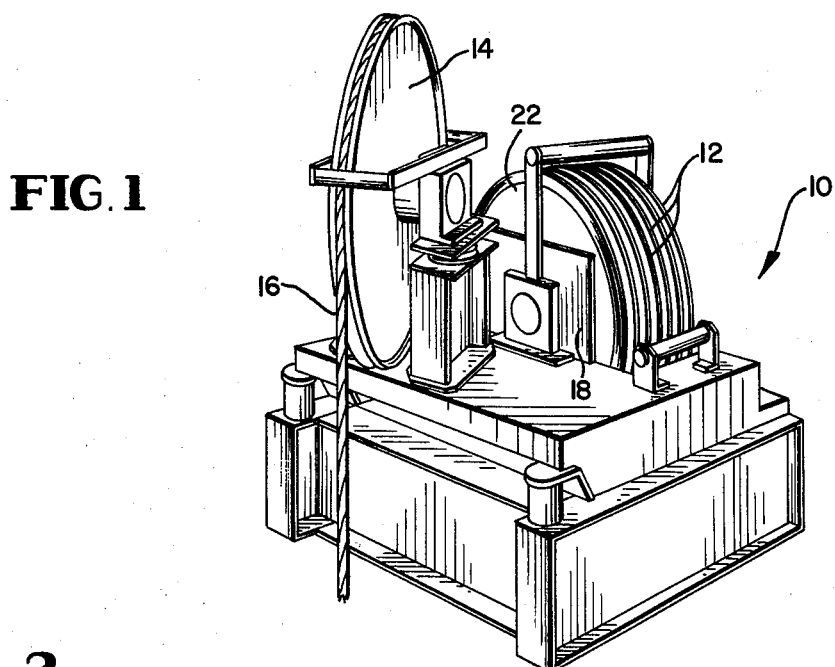
FIG. 1
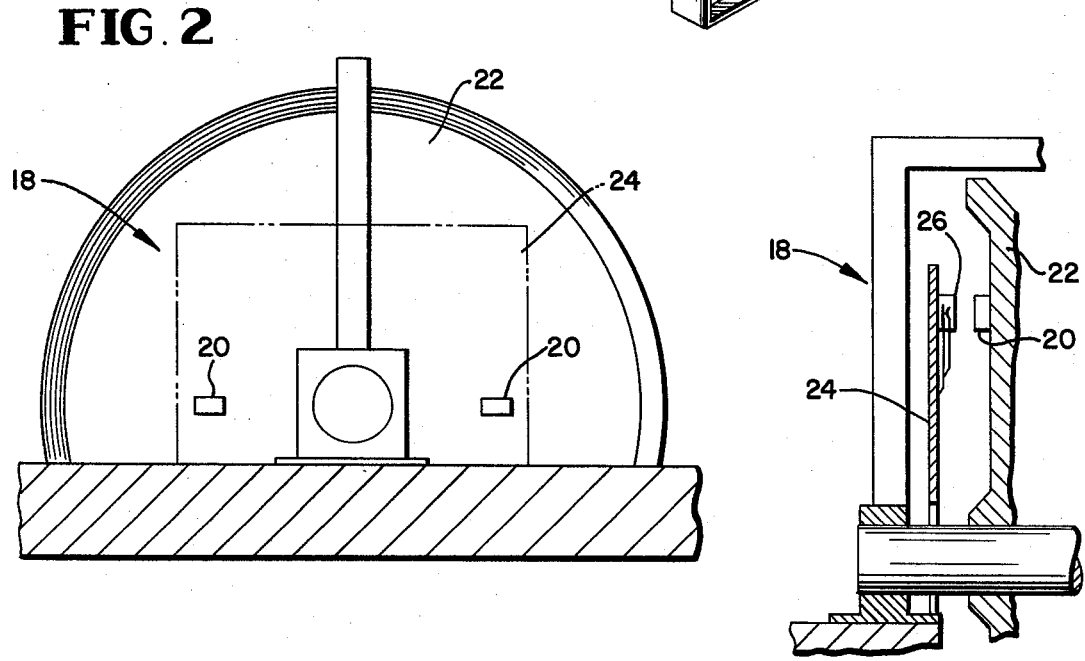
FIG. 2
FIG. 4
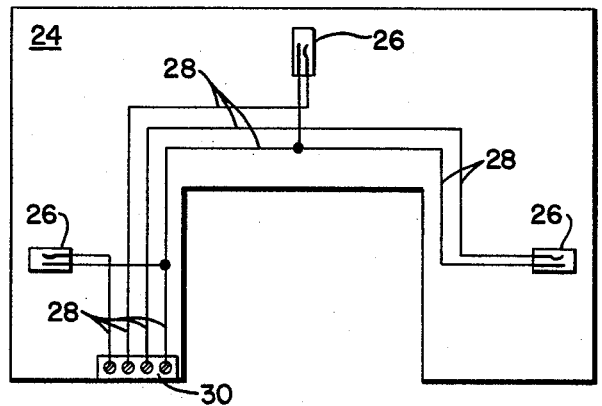
FIG. 3

ELECTRONIC TON-MILE INDICATOR

CROSS REFERENCE TO RELATED APPLICATION

Portions of the present disclosure are disclosed and claimed in prior copending application, Ser. No. 419,248 filed Nov. 27, 1973 and entitled Deadline Anchor Assembly for Electronic or Hydraulic Weight Indicators.

BACKGROUND OF THE INVENTION

In a stranded cable installation, the cable wears from continued use due to two equally important factors, these being distance travelled by the cable over the sheaves of the installation and load supported by the travelling block of the installation. This is particularly true in oil well drilling rigs. The cable used has a predetermined life span, measured as the product of the number of tons supported by the line times the number of miles the cable is run, providing a value designated as ton-miles.

Indicators for measuring cable ton-miles have been in use for a long time on drilling rigs, so that the rig operator may readily determine replacement time for the line or cable before it reaches the end of its theoretical life span. Although such prior art ton-mile indicators are generally inaccurate and occasionally even grossly inaccurate, their use has been generally accepted, using a suitable safety factor, in that a "close enough" readout is provided without the expensive and sometimes disastrous consequence of line failure.

In U.S. Pat. No. 3,390,574, a simple hydraulic-mechanical ton-mile indicator is disclosed. Attempts to convert to electrical ton-mile indicators are disclosed in U.S. Pat. Nos. 3,298,226 and 3,538,761, but the weight sensing means is purely hydraulically actuated with a mechanical integrator required to provide a ton-mile readout. U.S. Pat. No. 3,750,130 discloses a magnet-magnetic reed switch assembly (FIG. 8) for measuring cable distance travel in a boom crane but no ton-mile calculation system is even suggested. Another and more completely electrical ton-mile indicator is disclosed in U.S. Pat. No. 3,382,713 and includes a counting drum and switch system to pulse a counter which gives a ton-mile readout, but even here, the weight sensor is hydraulically actuated. Hydraulically actuated components are too susceptable to the temperature variations of field conditions to provide reliable, accurate readouts and the distance measurement components disclosed in these prior art patents will not react reliably to 6 inches of movement or less as will the instant invention.

As wells are drilled deeper and deeper, to 10,000 feet, 15,000 feet and beyond with extreme loads ranging from 30,000 pounds up to 1,000,000 pounds or more, the need for accurate ton-mile measurement becomes more acute. However, cable movement even in deep wells is most often incremental and repetitive over a long period of time. Thus, ton-mile measurement becomes extremely difficult while, simultaneously, the error percentage factor increases alarmingly.

These factors of heavy load, great well depth and repetitive incremental cable movement over a long period of time necessitate extremely accurate ton-mile measurement and thus make even the somewhat inaccurate prior art ton-mile indicators obsolete.

The present invention overcomes these prior art disadvantages by providing a ton-mile indicator primarily based upon electronic components to provide an extremely accurate ton-mile readout regardless of the factors of extreme well depth, cable load, and repetitive, incremental cable movement.

SUMMARY OF THE INVENTION

Therefore, it is a primary object of the invention to provide a highly accurate and reliable ton-mile indicator primarily based upon electronic components.

It is yet another object of the invention to provide a ton-mile indicator having an electronic rotation counter, an electronic weight sensator and a multiplier circuit integrator for calculating ton-miles.

It is another object of the invention to provide a ton-mile indicator having an electronic rotation counter mounted adjacent a rotating sheave of a cable installation and an electronic weight sensator mounted beneath the pillow block of another sheave of the installation or on the same sheave as the rotation counter.

It is a further object of the invention to provide a ton-mile indicator having its weight indicating component in the form of a resistance strain gauge means, forming one leg of a bridge circuit thereby providing an interpretable weight indicating signal as the bridge circuit is unbalanced by compression of the strain gauge caused by weight applied to the member upon which the strain gauge is mounted.

It is yet a further object of the invention to provide a ton-mile indicator having its weight indicating component in the form of a piezoelectric crystal sandwiched between portions of a weight bearing member to provide an interpretable weight indicating signal as the weight bearing member is compressed.

A still further object of the invention is to provide a ton-mile indicator for a well drilling rig or the like having an electronic weight sensator mounted either in the pillow block of the fast line sheave of the crown block or in the deadline anchor of the rig.

Yet still another object of the invention is to provide a ton-mile indicator having its distance measuring component in the form of multiple magnet-magnetic reed switch pulse generators associated with a rotatable member for extremely accurate calculation of cable distance travelled regardless of direction of travel or incremental distance travelled.

Further novel features and other objects of this invention will become apparent from the following detailed description, discussion and the appended claims taken in conjunction with the accompanying drawings.

BRIEF DESCRIPTION OF DRAWINGS

Preferred structural embodiments of this invention are disclosed in the accompanying drawings in which:

FIG. 1 is perspective view of the crown block of a well drilling rig illustrating location of the electronic weight sensing and distance travelled components of the invention, in a preferred embodiment;

FIG. 2 is a partial elevation view of the crown block shown in FIG. 1, showing part of the rotation counter and drawn to an enlarged scale;

FIG. 3 is an elevation view of the proximity switch carrier portion of the rotation counter;

FIG. 4 is a partial section view showing mounting of the rotation counter in the crown block;

DESCRIPTION OF THE PREFERRED EMBODIMENTS

Figure 5:
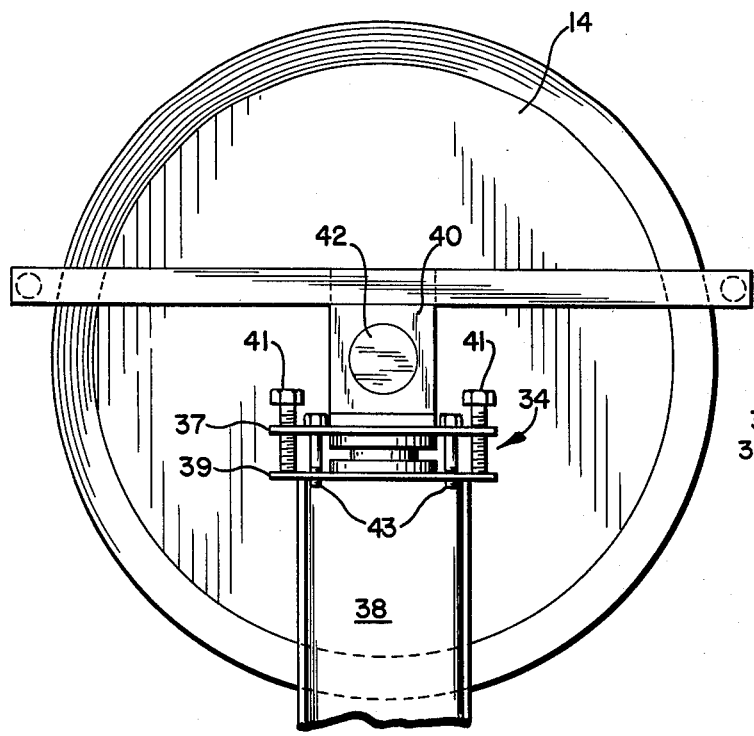
FIG. 5 is a partial elevation view showing mounting of the weight sensator in the fast line sheave pillow block of the crown block of FIG. 1, and drawn to an enlarged scale.
Figure 6:
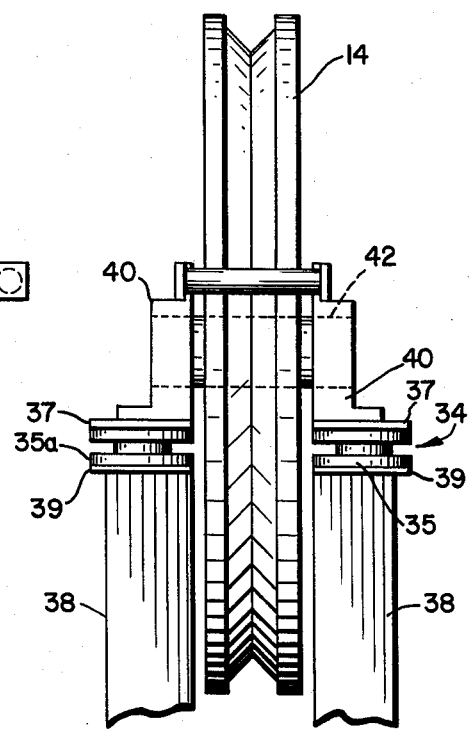
FIG. 6 is a side elevation view of the fast line sheave shown in FIG. 5.

A standard drilling rig includes a derrick (not shown) having a crown block 10 at the upper end of the derrick with rotatable sheaves 12 mounted therein and a fast line sheave 14. The specific crown block shown is manufactured by the Lee C. Moore Corporation and per se forms no part of the instant invention. A portion of the drilling rig cable or line 16 is illustrated. Basically, the cable in a well drilling rig includes a deadline secured at the base of the rig, stranded through sheaves 12 and the travelling block of the rig (not shown) from which the drill string is suspended (not shown) where it becomes a live or fast line and then to fast line sheave 14 and to the drum of the drawworks (not shown).

The point here is to measure both weight applied to the cable and distance the cable travels, and to provide solely electronic devices to measure these factors.

A rotation counter, generally indicated at 18 in FIG. 1, includes a pair of magnets 20 (FIG. 2) spaced apart 180° on inboard crown block sheave 22. Mounted adjacent inboard sheave 22 is a proximity switch carrier 24, shown most clearly in FIG. 3 and whose position adjacent inboard sheave 22 is shown in phantom lines in FIG. 2. Carrier 24 includes three magnetic reed proximity switches 26, which are serially, momentarily closed as a magnet 20 passes thereby (FIG. 4) during rotation of inboard sheave 22. The closing of a switch 26 causes a pulse in a line 28 which is connected to a terminal block 30 and thence to means for counting the pulses to calculate the distance inboard sheave 22 has rotated and, consequently, the distance cable 16 has travelled, as will be set forth in detail below.

Figure 11:
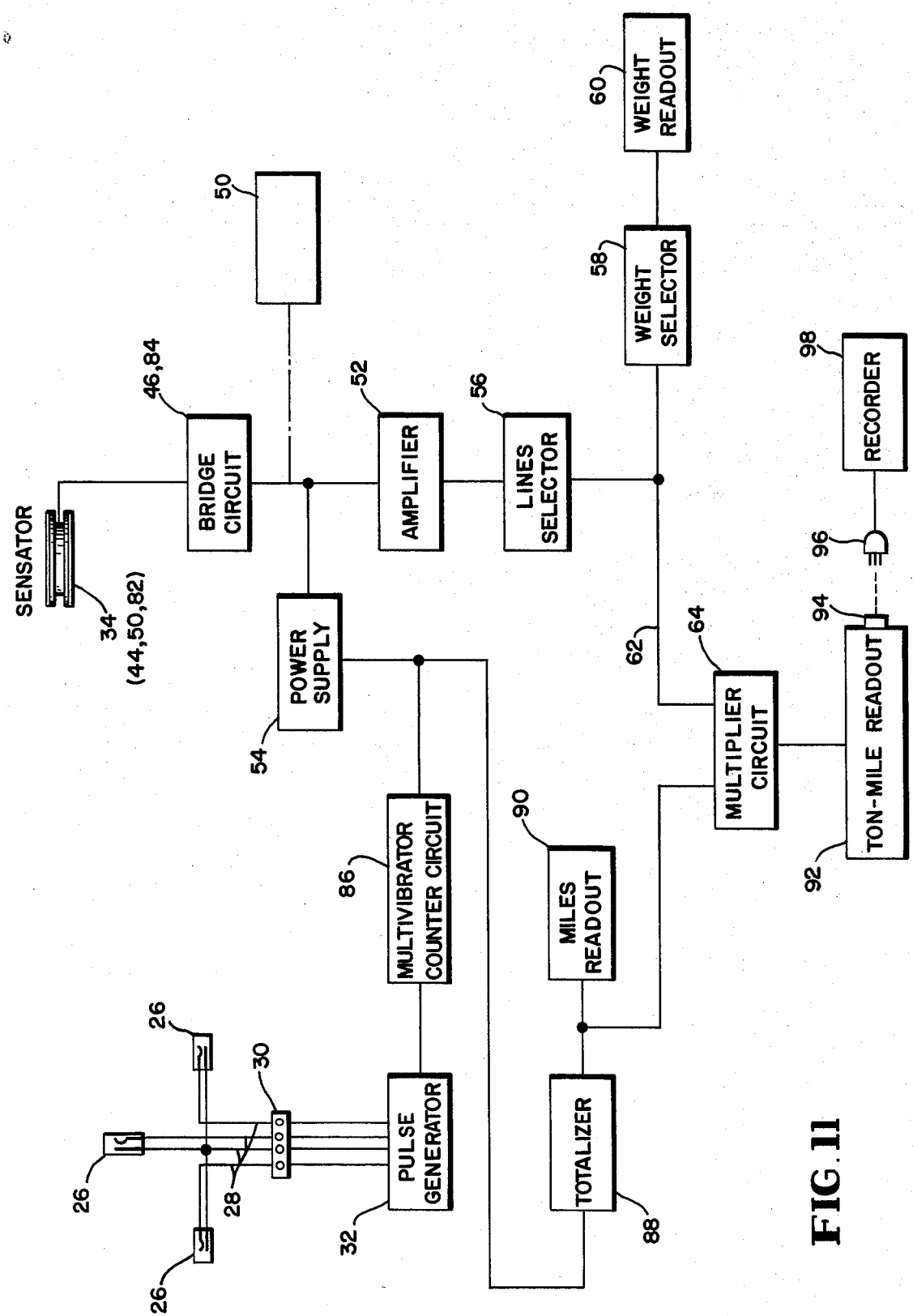
FIG. 11, is a schematic wiring diagram of the invention.

In this preferred embodiment, three switches 26 and two magnets 20 are provided so that each one-quarter revolution of sheave 22 is measured, regardless of direction of rotation. Additionally, opposed magnets 20 and two of the switches 26 opposed 180° are thus arranged so that upon alignment of two switches and two magnets, which occurs upon each one-half revolution of sheave 22, one pulse is precisely simultaneous with the other so that, in effect, only one pulse is received in pulse generator 32 (FIG. 11). This assures that each quarter revolution of sheave 22 is sensed, regardless of direction and in this manner, a highly reliable, accurate readout of distance travelled by cable 16 is acquired.

In one case, it has been found that the number of switches 26 provided should be sufficient to measure each 6 inches of travel by cable 16. Additionally, of course, switches 26 should be evenly circumferentially spaced on carrier 24 with respect to sheave 22. Obviously, the larger the diameter of sheave 22, the greater the circumference of sheave 22 will be and thus the number of switches 26 required to measure as little as 6 inches of travel of cable 16 will have to be increased. The formula for determining the number of switches required is:

$$N = \frac{C}{2D} + 1;$$

where

N = number of switches;
C = circumference of sheave 22 in inches; and
D = Distance of line travel between pulses (sensitivity)

In the present embodiment, assume a sheave 22 circumference of 24 inches and distance travel between pulses of 6 inches. The formula provides the answer: three switches, as illustrated in FIG. 3.

If greater sensitivity is desired, the D value may be reduced accordingly in order to provide even a more accurate readout.

In the present embodiment, rotation counter 18 is mounted adjacent inboard sheave 22. It could also be mounted adjacent fast line sheave 14. Two other possible embodiments include mounting magnets and switches on plates other than a sheave and rotate the magnet plate by a friction wheel, riding either on a sheave or on line 16 directly (not shown). In both cases, ratio of friction wheel circumference to magnet plate circumference must be calculated when determining sensitivity as set forth above in the formula for determining number of switches 26.

Magnets 20 and magnetic reed switches 26 form no part of the instant invention per se. Each is well known in the art. Suitable magnets and switches for the purposes of this invention are manufactured by the Hamlin Company of Lake Mills, Wis., stock Nos. 5701 and 5801, respectively.

Turning now to FIGS. 5-10 inclusive, several embodiments of the weight sensing component of the invention will be explained. In the embodiments shown in FIGS. 5-7, the electronic weight sensator 34 is located on a cylindrical metal element 35 having a central, circumferential groove 36 and is mounted between one of the fast line sheave support columns 38 and pillow block 40 or shaft 42 of fast line sheave 14. The other element 35a is merely a dummy, configured similarly to equalize the mounting of fast line sheave shaft 42.

In order to install and replace elements 35 and 35a without having to disassemble the entire fast line sheave and its supports, a plate 37 is mounted on each column 38 and a plate 39 is attached as a base for each pillow block 40 (FIG. 5). Installation bolts 41 threaded through plate 37 abut plate 39; thus threading in bolts 41 separates plates 37 and 39 for installation of an element 35 or 35a. Lateral shifting between plates 37 and 39 is prevented by retention bolts 43, which are threaded to plate 39, but pass freely through bores in plate 37. Thus once element 35 of 35a is installed, installation bolts 41 are unthreaded so that full weight of the fast line sheave assembly bears on the elements 34 and 35a. Since retention bolts 43 are threaded only to plate 39, plate 37 and thus the fast line sheave assembly are free to move vertically, minutely to compress elements 35 and 35a.

Figure 7:
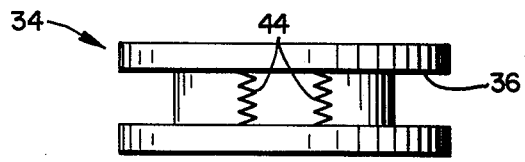
FIG. 7 is a partial detail elevation view showing one embodiment of a weight sensator.

In the embodiment shown in FIG. 7, electronic weight sensator 34 comprises two or more strain gauges 44 wired in series to form one leg of a bridge circuit 46 (FIG. 11). The number of strain gauges 44 provided will probably be four, but may be as many as 16 depending on the size of the installation.

Each strain gauge 44 is essentially a very small, variable resistance resistor having a grid pattern transverse to the height of cylindrical element 35 so that as element 35 is compressed by a load applied by cable 16 through fast line sheave 14, shaft 42 and pillow block 40, each gauge 44 is likewise compressed, thereby changing its resistance to unbalance bridge circuit 46 to give an interpretable output signal. Strain gauges 44 are well known, per se form no part of the instant invention, and are presently on the market. For example, Micro-Measurements, a division of Vishay Intertechnology Inc. of Romulus, Mich. markets a wide variety of such gauges, suitable ones for the present invention being illustrated in their 1973 Bulletin PB-108-2 (CEA Series Strain Gauges) and catalog short-form 95. Suitable interconnecting wire and cable is disclosed in Micro-Measurements Bulletin A-135-2 (June 1971). If desired, gauges 44, bridge circuit 46 and the associated interconnecting wiring may be permanently encased within groove 36 by a suitable waterproof plastic material (not shown). A suitable coating or coatings may be selected from Micro-Measurements Bulletin A-134-3 (April, 1973).

In the usual application of strain gauges of the type disclosed, the gauges are temporarily mounted on a body to ascertain stress being applied to that body in a test situation (e.g., aircraft frame and wing testing). Conversely here, strain gauges 44 are permanently mounted in groove 36 of element 35 wherein compression values are predetermined at known weight loads. In other words, rather than force being measured to determine compression, compression is measured to determine force, or load weight.

Figure 8:
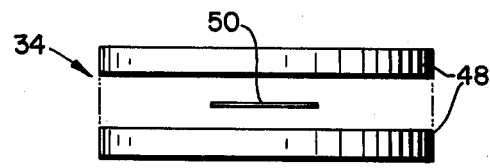
FIG. 8 is an exploded partial detail elevation view showing another embodiment of a weight sensator.

In the embodiment shown in FIG. 8, cylindrical element 35 is formed as a pair of wafers 48 having sensator 34 in the form of a piezoelectric crystal 50 sandwiched therebetween. As is known, piezoelectric crystal resistance varies upon application of pressure and this change in resistance may be easily measured to determine load on cable 16. Of course, the bridge circuit 46 (FIG. 11) would not be needed in this embodiment, so the signal may be fed directly to an amplifier 52 (FIG. 11).

The weight readout component circuitry is illustrated on the right side of FIG. 11 and is similar to that disclosed in the aforementioned, prior copending application. A power supply 54 includes a standard 110 VAC source rectified to a D.C. voltage (not shown). Power supply 54 may include an internal battery to provide voltage on loss of A.C.; the battery will be recharged by the rectifier when not in use (not shown).

The output signal from either bridge circuit 46 or piezoelectric crystal 50 is amplified at 52 and fed to a lines selector switch 56. Switch 56 simply modifies the amplified output signal depending on the number of lines strung from crown block 10 to the travelling block (not shown). Obviously, the strain on cable 16 over fast line sheave 14 will vary (decrease) if more lines are strung and vice versa. Thereafter, the signal is fed both to a weight readout including a weight selector switch 58, which further modifies the signal to read total string weight or merely bit weight on bottom, and a visual weight readout 60 which may have both a calibrated dial and digital readout, and via line 62 to multiplier circuit 64, details of which will be explained below. Further details of power supply 54, lines selector switch 56, weight selector switch 58 and readout 60 may be obtained by referring to the aforementioned prior, copending application.

Figure 9:
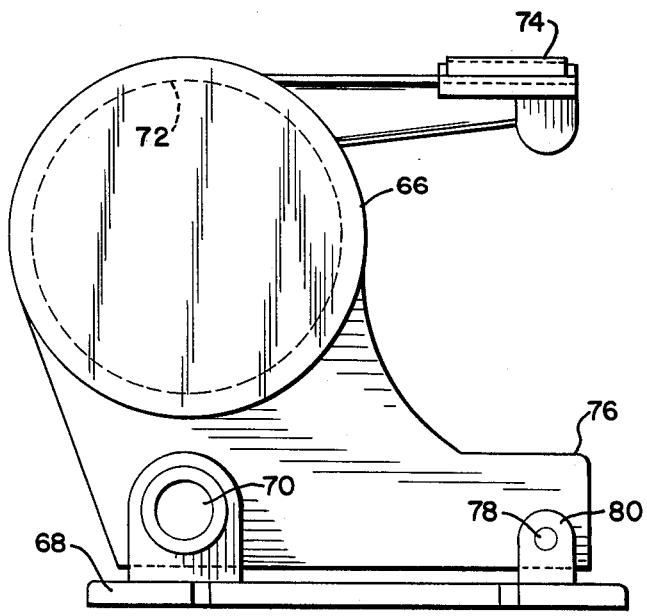
FIG. 9 is an elevation view of a deadline anchor in a well drilling rig.
Figure 10:
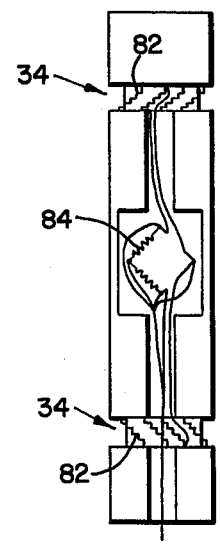
FIG. 10, is a plan view of another embodiment of a weight sensator, mounted in the deadline anchor shown in FIG. 9, and drawn to an enlarged scale.

Another embodiment of the weight output signal generation component of the present invention is illustrated in FIGS. 9 and 10. In this case, the weight sensator is located in deadline anchor 66 of the drilling rig rather than beneath a pillow block of the fast line sheave. Anchor 66 is pivotally mounted in a stationary base 68 at 70 and has a snubbing drum 72, about which the deadline is wound (not shown), and a line clamp 74 to secure the free end of the deadline. Force on the deadline tends to rotate anchor 66 counterclockwise, in the sense of FIG. 9, thus tending to lift toe 76 of anchor 66. Toe 76 is restrained by an electronic sensator pin 78 mounted through toe 76 and ears 80 of base 68. As shown in FIG. 10, pin 78 includes the electronic weight sensator 34 of this embodiment, or two sets of strain gauges 82 each forming a leg in bridge circuit 84 located centrally in pin 78. Pin 78 is externally grooved and centrally bored to receive gauges 82 and bridge circuit 84 which may be encased therein in the same manner as set forth above with respect to strain gauges 44 on element 35. As toe 76 is forced upwardly, pin 78 is stressed thereby compressing strain gauges 82 to unbalance bridge circuit 84, to provide an interpretable output signal to amplifier 52 (FIG. 11) which is then modified in the same manner as hereinbefore discussed.

Referring now to the left hand side of FIG. 11, the circuitry for the electronic distance measuring component and the multiplier for a final ton-mile readout will be discussed. The pulses from magnetic reed switches 26 are received in pulse generator 32 which is actuated by the input signals to produce triggering pulses which, in turn, are fed to a multi-vibrator 86 which counts the pulses. Thereafter, a totalizer 88 receives the counted pulses and feeds both a miles readout 90 and multiplier 64. Of course, power for the electronic distance measuring component is also provided by power supply 54.

Multiplier 64 merely receives distance signals and weight signals from the respective components and multiplies them together to provide a ton-mile readout at 92. If desired, readout 92 may include a jack 94 for plug 96 of a recorder 98 for a permanent record of the ton-mile readout.

As used in the foregoing specification and appended claims, the term "ton-mile indicator" is defined as an instrument for both sensing load and distance values as well as indicating the product of the values.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An electronic ton-mile indicator in an oil well drilling rig or the like for sensing and indicating work done by the line in the rig, comprising; electronic distance measuring means for producing an output signal pulse for a predetermined linear increment of movement of the line past a given point, said electronic distance measuring means comprising rotatable switch actuation means responsive to movement of said line and stationary switch means located adjacent to and periodically closed by rotation of said switch actuation means for producing said output signal pulse upon closing of said switch means, said rotatable switch actuation means comprising a pair of magnets spaced apart 180° on a sheave in said oil well drilling rig or the like producing an interpretable output signal in response to a load applied to the line; and multiplier circuit means for receiving distance measuring output signal pulses and load responsive interpretable output signals and for multiplying said signals to produce an intelligible readout indicating ton-miles of work performed by the line.

2. The electronic ton-mile indicator as recited in claim 1, wherein said drilling rig line is trained over said sheave.

3. The electronic ton-mile indicator as recited in claim 1, wherein said stationary switch means comprise a plurality of proximity magnetic reed switches located in parallel plane relationship with respect to the plane of rotation of said magnets, said magnetic reed switches being circumferentially spaced apart about generally one-half of a circle having a diameter substantially equal to the distance between said magnets.

4. The electronic ton-mile indicator as recited in claim 3, wherein said proximity switches are three in number spaced 90° apart whereby each one-quarter revolution of said sheave causes actuation of at least one of said proximity magnetic reed switches irrespective of the direction of rotation of said sheave.

5. The electronic ton-mile indicator as recited in claim 3, wherein the number of magnetic reed switches required for reliable, accurate distance measurement is determined from the formula:

$$N = \frac{C}{2D} + 1;$$

wherein:
N = the number of switches;
C = the circumference of said sheave; and
D = the distance of line movement permitted between a pair of serial, periodic pulse actuations;
the factors C and D being expressed in units of like measurement.

6. The electronic ton-mile indicator as recited in claim 1, wherein said stationary switch means further comprise a stationary switch carrier mounted immediately adjacent said sheave in parallel plane relationship thereto.

7. An electronic ton-mile indicator in an oil well drilling rig or the like for sensing and indicating work done by the line in the rig, comprising: electronic distance measuring means for producing an output signal pulse for a predetermined linear increment of movement of the line past a given point, said distance measuring means including a rotatable unit, and a stationary unit; electronic weight sensing means for producing an interpretable output signal in response to a load applied to the line; and multiplier circuit means for receiving distance measuring output signal pulses and load responsive interpretable output signals and for multiplying said signals to produce an intelligible readout indicating ton-miles of work performed by the line, said electronic distance measuring means further comprising pulse generation means actuated by input signals from said rotatable and stationary units for producing triggering pulses, multivibrator means for counting said triggering pulses, and totalizer means for receiving said counted pulses and providing an input for said multiplier circuit means.

8. The electronic ton-mile indicator as recited in claim 7, wherein said electronic distance measuring means further comprise distance readout means for visually indicating distance of movement of said line, the input for said readout means being provided by said totalizer means.

9. An electronic ton-mile indicator in an oil well drilling rig or the like for sensing and indicating work done by the line in the rig, comprising: electronic distance measuring means for producing an output signal pulse for a predetermined linear increment of movement of the line past a given point; electronic weight sensing means for producing an interpretable output signal in response to a load applied to the line; and multiplier circuit means for receiving distance measuring output signal pulses and load responsive interpretable output signals and for multiplying said signals to produce an intelligible readout indicating ton-miles of work performed by the line, said electronic weight sensing means comprising compression responsive output signal means having an electrical resistance value variable according to predetermined compression force applied thereto.

10. The electronic ton-mile indicator as recited in claim 9, wherein said load responsive output signal means comprise strain gauge means.

11. The electronic ton-mile indicator as recited in claim 10, wherein said load responsive output signal means further comprise bridge circuit means, one leg thereof being formed by said strain gauge means whereby upon compression of said strain gauge means, said bridge circuit means are unbalanced thereby producing said interpretable output signal.

12. The electronic ton-mile indicator as recited in claim 9, wherein said load responsive output signal means comprise piezoelectric crystal means.

13. The electronic ton-mile indicator as recited in claim 9, wherein said load responsive output signal means are mounted on the deadline anchor of the drilling rig and arranged to respond to tension applied to said line.

14. The electronic ton-mile indicator as recited in claim 9, wherein said load responsive output signal means further comprise means for mounting said compression responsive output signal means beneath the pillow block of a load supporting sheave in said drilling rig, over which said line is threaded.

15. The electronic ton-mile indicator as recited in claim 14, wherein said load responsive output signal means and said electronic distance measuring means are located beneath and adjacent said load supporting sheave, respectively.

16. The electronic ton-mile indicator as recited in claim 14, wherein said load responsive output signal means are located beneath said load supporting sheave and said electronic distance measuring means are located adjacent another load supporting sheave.

17. The electronic ton-mile indicator as recited in claim 14, wherein said means for mounting said load responsive output signal means beneath said load supporting sheave pillow block comprises a first mounting plate attached beneath said pillow block, a second mounting plate on support means for said pillow block, a plurality of bolts threaded through one of said plates and abutting the other of said plates for separating said plates for installation of said load responsive output signal means therebetween, and a plurality of retention bolts for said one plate threaded to said other plate, whereby said plates are movable toward and away from each other so that said pillow block bears against said load responsive output signal means.

18. The electronic ton-mile indicator as recited in claim 9, wherein said electronic weight sensing means further comprise amplifier means for enhancing said interpretable output signals and line selection switch means for modifying amplified output signals to a true weight load value according to the number of rovings in said drilling rig line.

19. The electronic ton-mile indicator as recited in claim 18, wherein said electronic weight sensing means further comprise readout means for visually indicating load applied to said drilling rig line.

20. The electronic ton-mile indicator as recited in claim 9, wherein said multiplier circuit means further comprise ton-mile readout means for visually indicating the product total of load and distance values received therein.

21. The electronic ton-mile indicator as recited in claim 20, wherein said multiplier circuit means further comprise recorder means for permanently recording said product total.

* * * * *